(12) United States Patent
Yamashita

(10) Patent No.: US 6,615,122 B1
(45) Date of Patent: Sep. 2, 2003

(54) IMPACT JUDGEMENT METHOD AND PASSENGER PROTECTION DEVICE

(75) Inventor: Toshiyuki Yamashita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/959,783

(22) PCT Filed: Mar. 17, 2000

(86) PCT No.: PCT/JP00/01683

§ 371 (c)(1),
(2), (4) Date: Nov. 7, 2001

(87) PCT Pub. No.: WO01/70545

PCT Pub. Date: Sep. 27, 2001

(51) Int. Cl.[7] .............................................. B60R 21/00
(52) U.S. Cl. ........................... 701/45; 701/46; 180/271; 180/274; 280/728.1; 280/734; 280/735
(58) Field of Search ..................... 701/45, 46; 180/271, 180/274, 282; 280/728.1, 734, 735

(56) References Cited

U.S. PATENT DOCUMENTS

| | | | | |
|---|---|---|---|---|
| 3,889,232 A | * | 6/1975 | Bell ........................... | 280/735 |
| 4,166,641 A | * | 9/1979 | Okada et al. ............... | 280/735 |
| 5,194,755 A | * | 3/1993 | Rhee et al. ................. | 307/10.1 |
| 5,390,951 A | * | 2/1995 | Iyoda ....................... | 280/730.2 |
| 5,967,548 A | * | 10/1999 | Kozyreff ..................... | 280/735 |
| 6,274,948 B1 | | 8/2001 | Blank et al. | |

FOREIGN PATENT DOCUMENTS

| | | | |
|---|---|---|---|
| DE | 197 40 019 | 3/1999 | |
| JP | 11-152010 | 6/1999 | ........... B60R/21/32 |
| WO | WO 97/48582 | 12/1997 | |

* cited by examiner

Primary Examiner—Michael J. Zanelli
Assistant Examiner—Eric M Gibson
(74) Attorney, Agent, or Firm—Sughrue Mion, PLLC

(57) ABSTRACT

A first reference-value is preset, the first reference value being a minimum value of a physical quantity detected by a car compartment sensor within a range where destruction of a sensor 2a or a sensor 3a disposed in the crushable area could occur as a result of the shocks applied in the crushable area. The sensor output detected by the sensor 2a or the sensor 3a is invalidated, when a physical quantity of the-sensor output detected by the car compartment sensor 6a in the safety area as a result of the shocks applied in the crushable area exceeds the first reference value, so that the erroneous determination according to the sensor 2a or the sensor 3a is avoided. A highly reliable determination as to whether a collision necessitates activation of an air bag device results.

9 Claims, 11 Drawing Sheets

IMPACT JUDGEMENT METHOD AND PASSENGER PROTECTION DEVICE

This application is the national phase under 35 U.S.C. §371 of PCT International Application No. PCT/JP00/01683 which has an International filing date of Mar. 17, 2000, which designated the United States of America and was not published in English.

TECHNICAL FIELD

The invention relates to a collision determination method and a passive safety device. More specifically, the invention relates to a collision determination method and a passive safety device, which are provided to protect an occupant from shocks by an air bag at the time of collision.

BACKGROUND ART

FIG. 1 is an arrangement configuration view, schematically showing the arranged position of acceleration detecting sensors used for the conventional air bag passive safety device of a car. In FIG. 1, reference numeral 100 denotes a car main body; 101 a first satellite sensor arranged in a predetermined position in an engine room on the right side in a traveling direction, and capable of detecting initial impact acceleration at the time of collision; 102 similarly a second satellite sensor arranged in a predetermined position in an engine room on the left side in a traveling direction, and capable of detecting initial impact acceleration at the time of collision; 103 a built-in vehicle right side sensor arranged, for example, on the right side of the vehicle, for detecting side collision from the right side in the travelling direction of the car; 104 a built-in vehicle left side sensor arranged, for example, on the left side of the vehicle, for detecting side collision from the left side in the travelling direction of the car; and 105 a car compartment sensor arranged in a front panel in a car compartment.

Next, an operation will be described.

In such a passive safety device using satellite sensors 101 and 102, when the vehicle undergoes a head-on collision, the satellite sensors 101 and 102, and the car compartment sensor.105 detect deceleration caused by the head-on collision. However, as shown in FIG. 2, the deceleration detected by the satellite sensors 101 and 102 immediately after the occurrence of a head-on collision exhibits a steeper change than that detected by the car compartment sensor 15. As a result, compared with a case where collision determination is made based on the deceleration detected by the car compartment sensor 105, collision determination based on the deceleration detected by the satellite sensors 101 and 102 can be executed faster.

As the conventional collision determination method and passive safety device are constructed in the foregoing manner, collision can be determined faster by attaching the satellite sensors 101 and 102 towards the front side. However, in the case of a collision where the satellite sensors 101 and 102 are crushed during the latter half of the collision as shown in FIG. 2, the reliability of data regarding the deceleration or the like detected by the satellite sensors 101 and 102 is not guaranteed. Thus, in a conventional device performing collision determination based on the data regarding the deceleration or the like detected by the satellite sensors 101 and 102, it is impossible to make accurate collision determination for a collision in which the satellite sensors are crushed in the latter half of the collision.

The present invention was made to solve the foregoing problems, and an object of the invention is to provide a collision determination method and a passive safety device capable of performing highly reliable collision determination even for a collision in which the satellite sensors are crushed in the latter half of the collision.

DISCLOSURE OF THE INVENTION

A collision determination method according to the invention comprises the steps of: presetting a first reference value T, the first reference value being a minimum value of, a physical quantity detected by a car compartment sensor within a range where destruction of sensor disposed in the crushable area could occur as a result of the shocks applied in the crushable area; and invalidating the sensor output detected in the crushable area, when a physical quantity of the sensor output detected in the safety area as a result of the shocks applied in the crushable area exceeds the first reference value.

With the above arrangement, collision determination can be executed promptly by the satellite sensors. When the shocks in the crushable area are so great that the satellite sensors are destroyed, the sensor output detected in the crushable area is invalidated, so that a determination is made as to whether the collision necessitates the operation of an air bag device, based on the sensor output detected in the safety area. Thus, erroneous determination caused by the destruction of the satellite sensors is prevented, making it possible to perform highly reliable collision determination with regard to the operation of the air bag device.

The collision determination method further includes the steps of: when the physical quantity of the sensor output detected in the safety area as a result of the shocks applied in the crushable area is smaller than the first reference value, comparing the sensor output detected in the crushable area with a second reference value preset as a criterion for determination of a need to operate the air bag device, under a condition that the physical quantity of the sensor output detected in the safety area has not exceeded the first reference value; and making a determination as to whether the collision necessitates an operation of the air bag device, based on a result of the comparison.

With the above arrangement, when a shock is applied which does not result in a collision of the sensor disposed in the crushable area, collision determination is made based on the sensor output of the sensor disposed in the crushable area. Thus, it is possible to perform highly reliable collision determination.

The collision determination method may further comprise the steps of: when the physical quantity of the sensor output detected in the safety area as a result of the shocks applied in the crushable area is smaller than the first reference value, comparing an integrated-value of the sensor output detected in the crushable area with a third reference value preset as a criterion for determination of a need to operate the air bag device, under a condition that the physical quantity of the sensor output detected in the safety area has not exceeded the first reference value; and making a determination as to whether the collision necessitates an operation of the air bag device, based on a result of the comparison.

With the above arrangement, when a shock is applied which does not result in a destruction of the sensor disposed in the destruction area in the crushable area, collision determination is made based on the integrated value of the sensor output of the sensor disposed in the crushable area. Thus, it is possible to perform stable and highly reliable collision determination.

The collision determination method may further comprise the step of: when the physical quantity of the sensor output detected in the safety area as a result of the shocks applied in the crushable area is smaller than the first reference value, making a determination as to whether the collision necessitates an operation of the air bag device based on an ON/OFF signal outputted when shocks necessitating an operation of the air bag device are applied in the crushable area, under a condition that the physical quantity of the sensor output detected in the safety area has not exceeded the first reference value.

With the above arrangement, when a shock is applied which does not result in a destruction of the sensor disposed in the collision area, collision determination is made based on a sensor output outputted as an ON/OFF signal from the sensor disposed in the crushable area. Thus, it is possible to perform highly reliable collision determination.

The collision determination method may further comprise the step of: making a determination as to whether the collision necessitates an operation of the air bag device, based on the sensor output resulting from the shocks detected in the crushable area, when the sensor disposed in the crushable area does not undergo a destruction even if the output of a sensor disposed in the safety area exceeds the first reference value in response to the shocks applied in the crushable area.

With the above arrangement, when shocks occur, in which the first reference value T is exceeded, but the destruction of the sensor in the crushable area is not confirmed, failure diagnosis is performed for the sensor of the crushable area. If no failures have occurred, collision determination is executed again by the sensor of the crushable area. Thus, it is possible to perform prompt and highly reliable collision determination.

A passive safety device according to the invention comprises: a first sensor disposed in a crushable area which is the first area to undergo a destruction as a result of a collision; a second sensor disposed in a safety area which undergoes shocks resulting from the collision later; and collision determination means presetting a first reference value, the first reference value indicating a physical quantity detected by a car compartment sensor within a range where destruction of a sensor disposed in the crushable area could occur as a result of the shocks applied in the crushable area, and invalidating a sensor output detected by the first sensor, when a physical quantity of a sensor output detected by the second sensor as a result of the shocks applied in the crushable area exceeds the first reference value.

With the above configuration, collision determination can be executed promptly based on the output of the first sensor. When a shock is applied in the crushable area and the first sensor undergoes a destruction, the sensor output detected by the first sensor can be invalidated. Thus, erroneous determination caused by the destruction of the satellite sensor is prevented, making it possible to perform highly reliable collision determination with regard to the operation of an air bag device.

According to the passive safety device of the invention, the collision determination means: compares, when the physical quantity of the sensor output detected by the second sensor as a result of the shocks applied in the crushable area is smaller than the first reference value, a value of the sensor output detected by the first sensor with a second reference value preset as a criterion for determination of a need to operate the air bag device, under a condition that the physical quantity of the sensor output detected by the second sensor has not exceeded the first reference value; and makes a determination as to whether the collision necessitates an operation of the air bag device, based on a result of the comparison.

With the above configuration, when a shock is applied but the first sensor does not undergo a destruction, collision determination is executed based on the sensor output of the first sensor disposed in the crushable area. Thus, it is possible to perform highly reliable collision determination.

According to the passive safety device of the invention, the collision determination means compares, when the physical quantity of the sensor output detected by the second sensor as a result of the shocks applied in the crushable area is smaller than the first reference value, an integrated value of the sensor output detected by the first sensor with a third reference value preset as a criterion for determination of a need to operate the air bag device, under a condition that the physical quantity of the sensor output detected by the second, sensor has not exceeded the first reference value; and makes a determination as to whether the collision necessitates an operation of the air bag device, based on a result of the comparison.

With the above configuration, when a shock is applied but the first sensor does not undergo a destruction, collision determination is executed based on the integrated value of the sensor output of the first sensor. Thus, it is possible to perform stable and highly reliable collision determination.

According to the passive safety device of the invention, the collision determination means: makes a determination, when the physical quantity of the sensor output detected by the second sensor as a result of the shocks applied in the crushable area, is smaller than the first reference value, as to whether the collision necessitates an operation of the air bag device based on an ON/OFF signal outputted when shocks necessitating an operation of the air bag device are applied in the crushable area, under a condition that the physical quantity of the sensor output detected by the second sensor has not exceeded the first reference value With the above configuration, when a shock is applied but the first sensor does not undergo a destruction, collision determination is executed based on the sensor output outputted as an ON/OFF signal from the first sensor. Thus, it is possible to perform highly reliable collision determination.

BEST MODES FOR CARRYING OUT THE INVENTION

To explain the present invention more in detail, the best modes of carrying out the invention will be described with reference to the accompanying drawings.

First Embodiment

Figure 1:
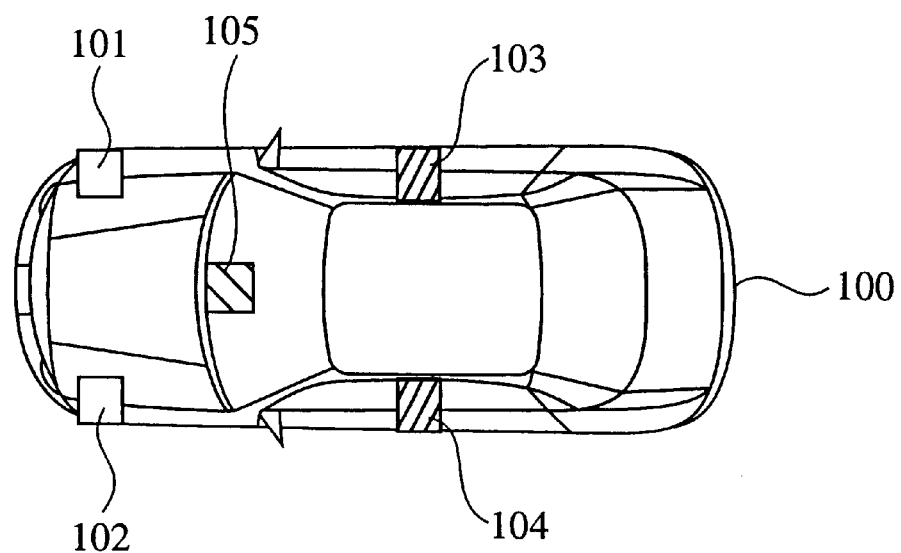
FIG. 1 is a view schematically showing an arrangement of acceleration detecting sensors used for a conventional air bag passive safety device of a vehicle.
Figure 3:
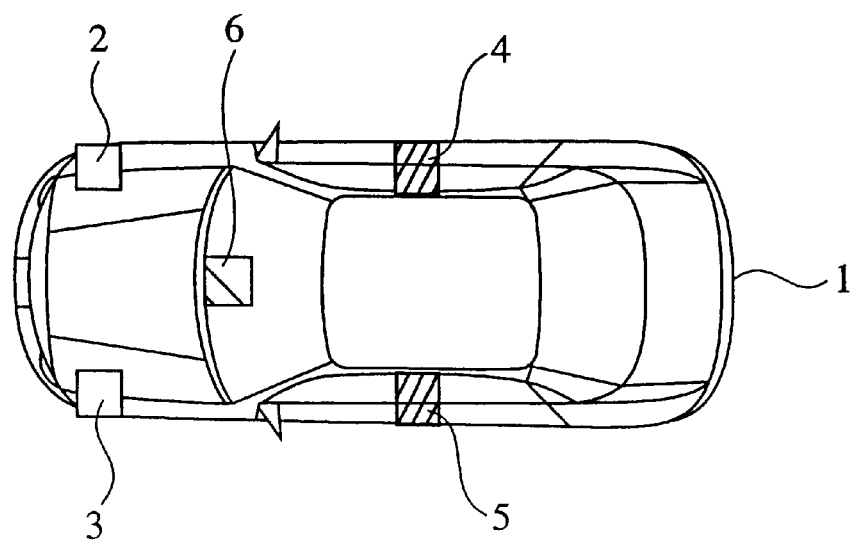
FIG. 3 is a view schematically showing an arrangement of acceleration detecting sensors of a passive safety device of a vehicle, to which a collision determination method of embodiments of the present invention is applied.
Figure 2:
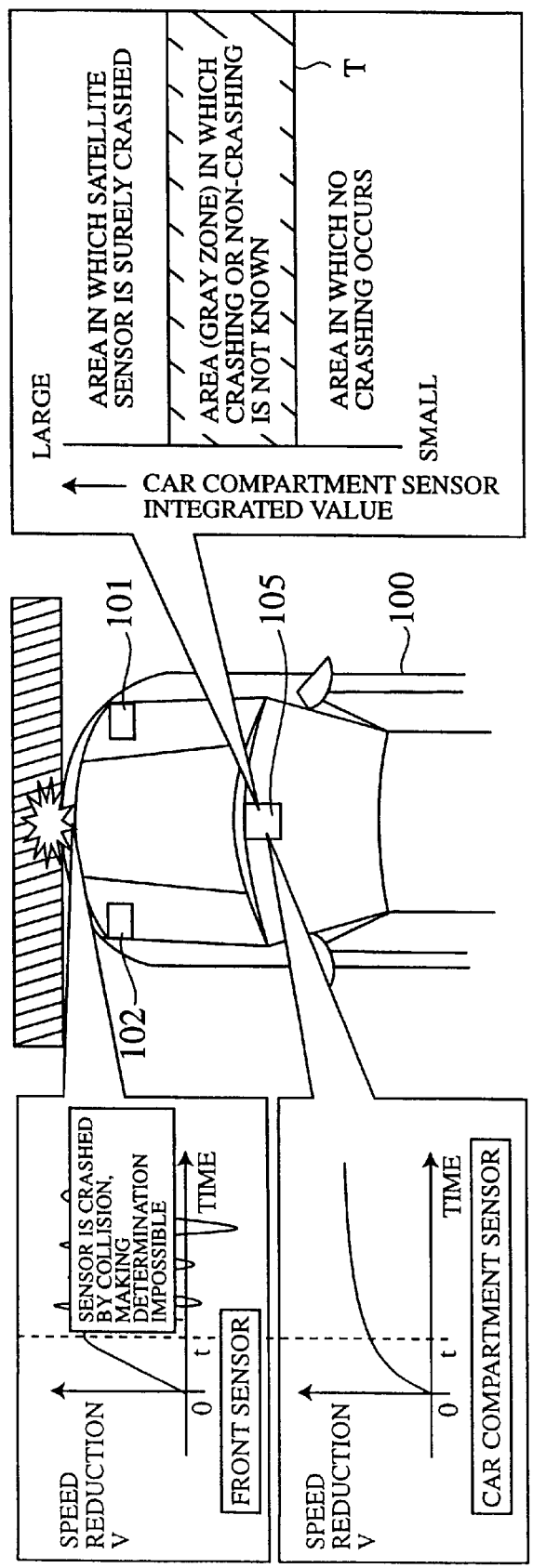
FIG. 2 is a view illustrating decelerations respectively detected by a satellite sensor and a car compartment sensor immediately after a head-on collision occurs.
Figure 4:
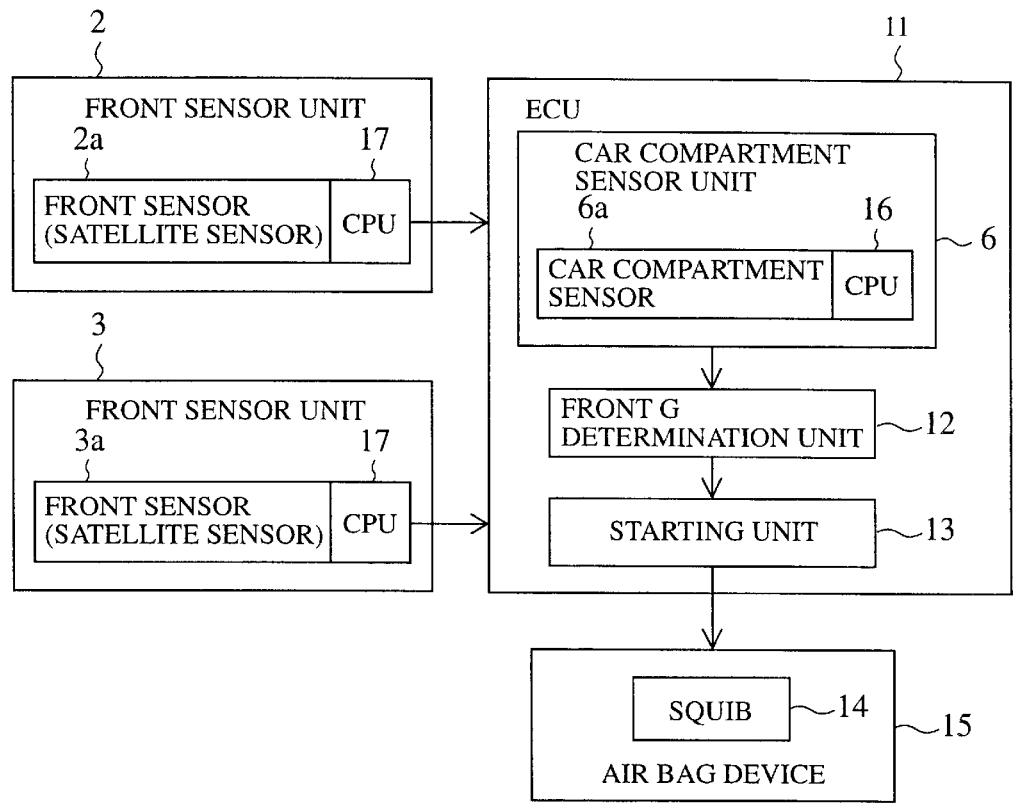
FIG. 4 is a block diagram showing a passive safety device using a first satellite sensor and a car compartment sensor according to a first embodiment of the invention.

FIG. 3 is a view schematically showing an arrangement of acceleration detecting sensors of a passive safety device of a vehicle, to which the collision determination method of the embodiments of the invention is applied. Referring to FIG. 3 and FIG. 4 (describer later), a reference numeral 1 denotes a car main body; and 2a front sensor unit. This front sensor unit 2 includes: a first satellite sensor (first sensor) 2a and a CPU 17. The first satellite sensor 2a is disposed at a predetermined position in an engine room on the right side in a direction of travel, the engine room being characterized as a crushable area which is first to undergo shocks from a head-on collision. The first satellite sensor 2a is capable of detecting the shocks of initial collision, caused by a collision on the front or rear side of the vehicle. Such collisions are detected as an electric acceleration signal or a contact signal. The front sensor unit 2 outputs the electric acceleration signal or the contact signal of the shocks.

A reference numeral 3 similarly denotes a front sensor unit. This front sensor unit 3 includes a second satellite sensor (second sensor) 3a and a CPU 17. The second satellite sensor 3a is disposed at a predetermined position in the engine room on the left side in a direction of travel and capable of detecting the shocks of an initial collision which are caused by a collision on the front or rear side of the vehicle. Such collisions are detected as an electric acceleration signal or a contact signal. The front sensor unit 3 outputs the electric acceleration signal or the contact signal of the shocks.

A reference numeral 4 denotes a vehicle right side sensor unit. This vehicle right side sensor unit 4 includes: a vehicle right side sensor 4a and a CPU 22 (see also FIG. 11). The vehicle right side sensor 4a is disposed inside the right side of the vehicle, which is characterized as a crushable area receiving first shocks from a side collision on the right side of the vehicle in the direction of travel. The vehicle right side sensor 4a is capable of detecting shocks from the right side in a direction of travel as an electric acceleration signal or a contact signal; and a CPU 22. A reference numeral 5 denotes a vehicle left side sensor unit. This vehicle left side sensor unit 5 includes: a vehicle left side sensor 5a and the CPU 22. The vehicle left side sensor 5a is disposed inside the right side of the vehicle, which is characterized as a crushable area receiving first shocks from a side collision on the left side of the vehicle in the direction of travel. The vehicle left side sensor is capable of detecting shocks from the left side in a direction of travel as an electric acceleration signal or a contact signal.

For the first and second satellite sensors 2a and 3a, either an electronic acceleration sensor (system for electronically detecting an inertial force occurring when shocks are applied to a vehicle in a predetermined direction, and outputting an impact acceleration at the time of the shock application, as an electric acceleration signal), or a mechanical acceleration sensor (system for detecting an inertial force occurring when shocks are applied to a vehicle in a predetermined direction, as a mechanical displacement, and outputting the application of the impact acceleration of a given magnitude as an ON/OFF contact signal), may be used. According to the first embodiment, however, an electronic acceleration sensor is used.

Similarly, for the vehicle right side and left side sensors 4a and 5a, either an electronic or mechanical acceleration sensor may be used.

In the case of the electronic acceleration sensor for outputting an electric acceleration signal, a CPU is incorporated to perform signal processing for integrating and outputting the acceleration signal, or the like. In the case of the mechanical acceleration sensor for outputting a contact signal, however, such a CPU may not be incorporated.

A reference numeral 6 denotes a car compartment sensor unit. This car compartment sensor unit 6 includes: a car compartment sensor (second sensor) 6a and a CPU 16. The car compartment sensor 6a is disposed in the front panel of the car compartment, which is characterized as a safety area where shocks first applied to the crushable area is subsequently applied. The car compartment sensor unit 6 also includes acceleration sensors (electronic acceleration sensor) for detecting, as electric acceleration signals, shocks applied from the front or rear side when collision occurs on the front or rear side of the vehicle, and shocks applied from the right or the left side in a direction of travel when a side collision occurs on the right or the left side in a direction of travel of the vehicle.

The car compartment sensor 6a includes a CPU designed to perform signal processing for integrating the detected acceleration signal, or filtering the detected acceleration signal so as to extract a special frequency component generated during the latter half of the collision, and so on.

FIG. 4 is a block diagram showing the configuration of the passive safety device using the first satellite sensor 2a and the car compartment sensor 6a shown in FIG. 3. In the drawing, a reference numeral 11 denotes an electric control unit (referred to as ECU, hereinafter) for controlling each unit of the vehicle, by performing ignition control, failure diagnosis of an air bag and the like. The ECU 11 includes the above-described car compartment sensor 6, a front G sensor determination unit 12 (described later), and a starting circuit 13. A reference numeral 12 denotes the front G sensor determination unit (collision determination means) constituting the ECU 11. This front G sensor unit 12 performs collision determination based on the acceleration signal detected by the electronic acceleration 3 sensor of the first satellite sensor 2a, and the acceleration signal outputted from the acceleration sensor of the car compartment sensor 6a for detecting the shocks applied from the front or rear side of the vehicle.

A reference numeral 13 denotes the starting circuit designed to protect an occupant from a collision on the front side of the vehicle by detonating a squib 14 based on the determination result of the front G sensor determination unit 12. The starting circuit 13 starts an air bag device 15. The air bag device 15 is disposed in the front panel.

A reference numeral 16 denotes the CPU provided in the car compartment sensor 6a. This CPU 16 functions to perform signal processing for integrating or filtering the acceleration signal detected by the car compartment sensor 6a so as to extract a special frequency component generated during the latter half of the collision.

A reference numeral 17 denotes the CPU provided in the first satellite sensor 2a. This CPU 17 functions, for example, to output the acceleration signal detected by the electronic acceleration sensor of the first satellite sensor 2a or integrating the acceleration signal and outputting the result.

Next, an operation.will be described.

Figure 5:
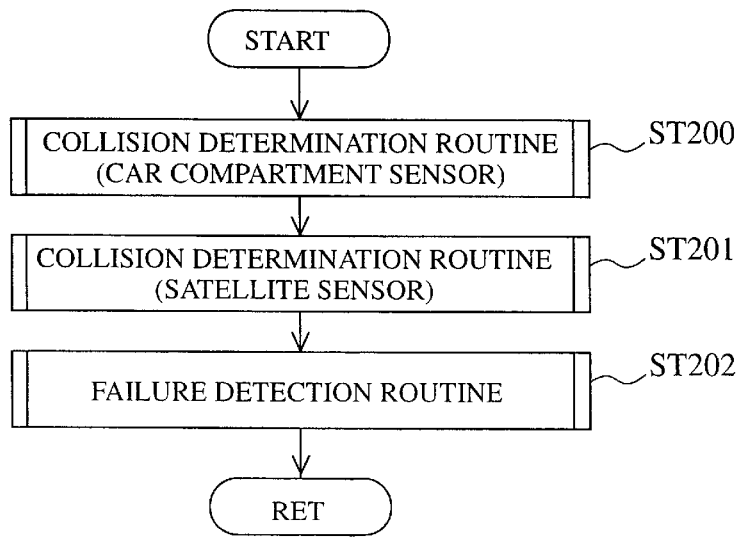
FIG. 5 is a flowchart showing an entire arrangement of a collision determination method in the passive safety device of the first embodiment of the invention.

FIG. 5 is a flowchart showing the entire arrangement of the collision determination method of the first embodiment. This arrangement includes: a collision determination routine (step ST200) by the car compartment sensor 6a; a collision determination routine (step ST201) for performing collision determination by using the first and second satellite sensors 2a and 3a, the vehicle right side and left side sensors 4a and 5a; and a failure detection routine (step ST202) for performing failure determination regarding the destruction or falling-off of the first and second satellite sensors 2a and 3a, the vehicle right side and left side sensors 4a and 5a.

Figure 6:
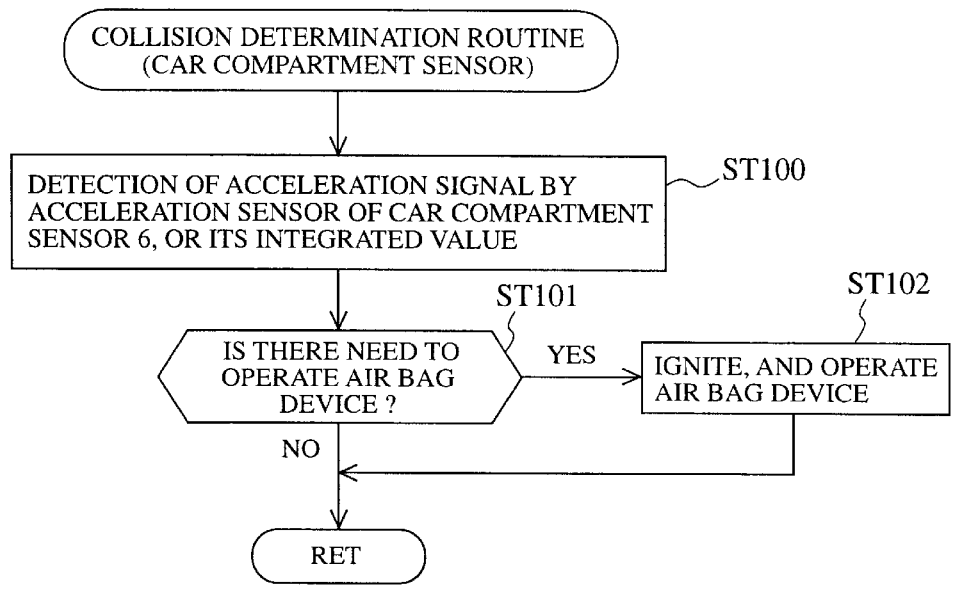
FIG. 6 is a flowchart showing a collision determination routine carried out by a car compartment sensor in the collision determination method, applied to the passive safety device of the first embodiment of the invention.

FIG. 6 is a flowchart showing the collision determination routine by the car compartment sensor 6a in step ST200 of the flowchart of FIG. 5. The collision determination processing shown in FIG. 6 is carried out to perform control as to the ignition of the squib 14, and the operation of the air bag device provided in the front panel. The control is based on the acceleration signals or their integrated values outputted from the acceleration sensors of the car compartment sensor 6a for detecting impact acceleration caused by collision on the front or rear side of the vehicle, and reference values designated for the acceleration signals and their integral values for determination of a need to operate the air bag device. Alternatively, the collision determination processing is carried out to perform control as to the ignition of the squib, and the operation of the air bag device, based on the acceleration signals or their integrated values outputted from the acceleration sensors for detecting an impact acceleration caused by a side collision on the vehicle right or left side, and reference values designated for the acceleration signals and their integrated values for determination of a need to operate the air bag device disposed inside the right side door or the left side door of the vehicle.

Specifically, control processing is carried out for detection and capturing of the acceleration signals or their integrated values by the acceleration sensors of the car compartment sensor 6a (step ST100), determination as to a need to operate the air bag device based on the reference values designated for the captured acceleration signals or their integrated values (step S101) the ignition of the squib and the operation of the air bag when the need to operate the air bag device is determined in the determination step (step ST102).

Figure 7:
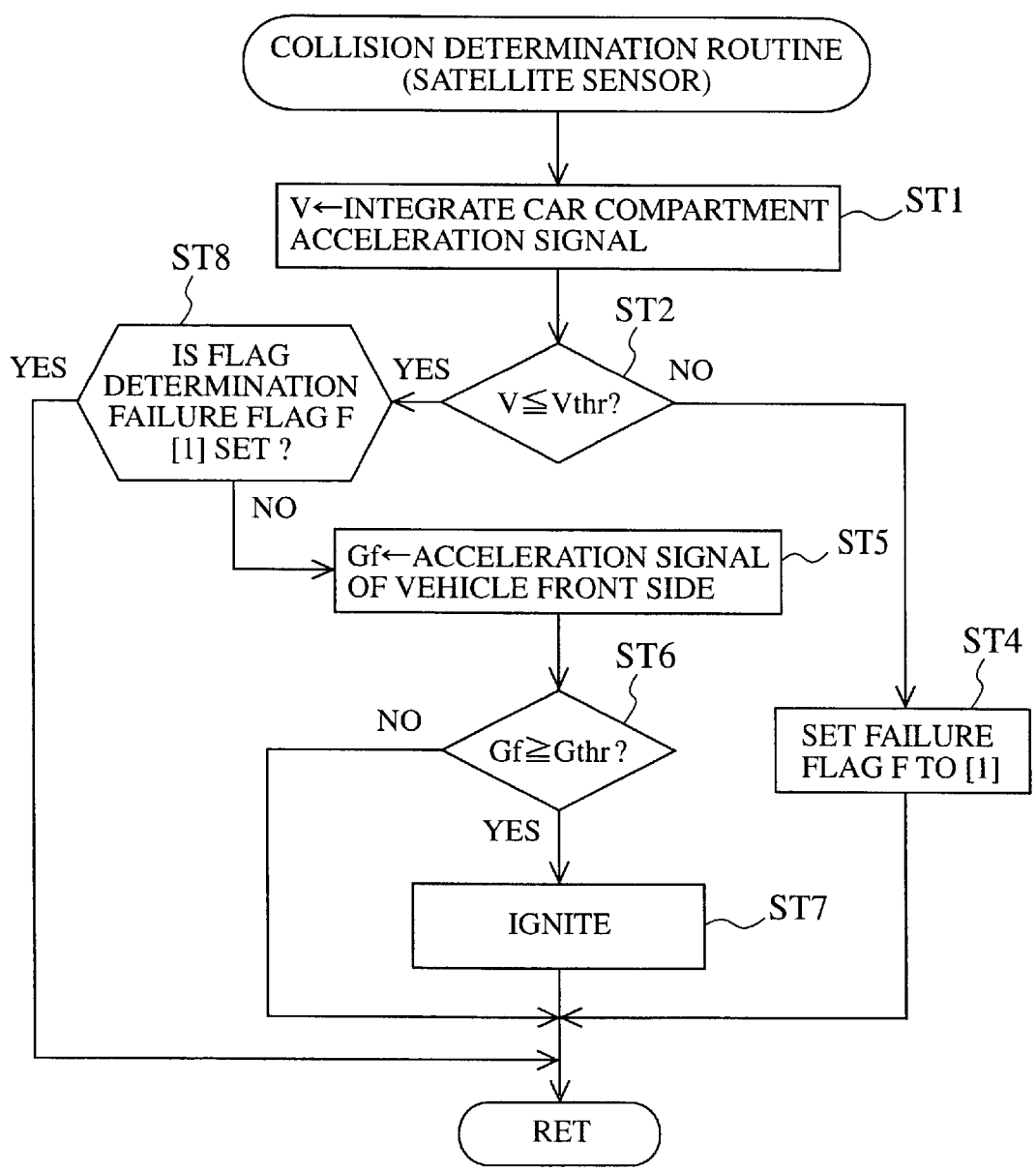
FIG. 7 is a flowchart showing a collision determination routine for performing collision determination by using the first satellite sensor, in the collision determination method of the passive safety device of the first embodiment of the invention.

FIG. 7 is a flowchart showing the collision determination routine of step ST201 shown in FIG. 5, specifically showing a collision determination operation applied to the passive safety device shown in FIG. 4. This flowchart is an example of collision determination when a collision occurs on the front side of the vehicle. The collision determination is executed by the front G sensor determination unit 12 provided in the ECU 11.

First, a description is made of a case where a collision on the front side of the vehicle is small in scale and causes no destruction or detachment of the electronic acceleration sensor of the first satellite sensor 2.

In-this case, acceleration signals are outputted from the acceleration sensors of the car compartment sensor 6a when collision occurs on the front side of the vehicle, and an integrated value V, which is a result of integration of the acceleration signals carried out by the CPU 16 of the car compartment sensor 6a (this integrated value V is reset for each completion of an operation in the flowchart of FIG. 7), is fetched by the front G sensor determination unit 12 of the, ECU 11 (step ST1).

Then, the fetched integrated value V is compared with a preset threshold value Vthr, and determination is made as to whether the integrated value V is equal to the threshold value Vthr or lower (step ST2).

Here, the threshold value Vthr is set equal to a minimum value of a physical quantity detected by the car compartment sensor within a range in which the sensor provided in a crushable area can be destructed.

In the described case, since the collision on the front side of the vehicle is small in scale and does not cause a destruction of the acceleration sensor of the first satellite sensor 2a, the integrated value V is equal to the threshold value Vthr or lower. Therefore, the process proceeds to step ST8, where determination is made as to the setting of a failure flag F (flag set when there is a possibility of destruction or detachment of the first satellite sensor 2a). If the result of the determination is that no failure flag has been set, an acceleration signal Gf produced by the acceleration sensor of the first satellite sensor 2a is fetched (step ST5). Then, the fetched acceleration signal Gf is compared with a preset threshold value Gthr, and a determination is made as to whether the acceleration signal Gf is equal to the threshold value Gthr or higher (step ST6).

Here, the threshold value Gthr is designated for the output of the acceleration sensor of the first satellite sensor 2 and is used as a criterion for determination of a need to operate the air bag device 15.

In this case, assuming that collision on the front side of the vehicle is small in scale and causes no destruction or detachment of the acceleration sensor of the first satellite sensor 2a, and assuming that the acceleration signal Gf produced by the acceleration sensor of the first satellite sensor 2a exceeds the threshold value Gthr (Gf≧Gthr), then the front G sensor determination unit 12 detonates the squib 14 by the starting circuit 13, thereby operating the air bag device 15 (step ST7). On the other hand, in step ST6, if the acceleration sensor of the first satellite sensor 2a does not undergo a destruction, and the acceleration signal Gf detected by the acceleration sensor of the first satellite sensor 2a does not exceed the threshold value the threshold value Gthr (Gf≦Gthr), then the front G sensor determination unit 12 does not detonate the squib 14, and thus the air bag device 15 is not operated.

Thus, if a collision is such that the integrated value V of the acceleration signals detected by the acceleration sensors of the car compartment sensor 6a for detecting shocks applied to the vehicle rear or front side is small in scale, and no destruction or detachment of the acceleration sensor of the first satellite sensor 2a occurs, an prompt determination as to the collision is made by determining that shocks necessitating the operation of the air bag 15 occur, in which the acceleration signal Gf produced by the acceleration sensor of the first satellite sensor 2a exceeds the threshold value Gthr. This determination is made using the electronic acceleration sensor of the first satellite sensor 2a during the first half of the collision. Based on the result of the determination, the air bag device 15 is operated, making it possible to quickly protect the occupant from the collision on the front side of the vehicle.

Next, description is made of a case where collision on the front side of the vehicle is severe, and the electronic acceleration sensor of the first satellite sensor 2a is destructed or falls off during the latter half of the collision.

In such a collision, the integrated value V fetched in step ST1 exceeds the threshold value Vthr. Thus, in step ST2, it is determined that the integrated value V is larger than the threshold value Vthr, and the process proceeds to step ST4. The failure flag F is set, and then the process moves to a next operation cycle.

In the next operation cycle, the operation is repeated from step ST1.

Then, the process proceeds from step ST1 to step ST2, where the integrated value V fetched in the current operation cycle is compared with the present threshold value Vthr, and determination is made as to whether the integrated value V is equal to the threshold value Vthr or lower. If it is determined that the integrated value V exceeds the threshold value Vthr, the process proceeds to step ST4. However, when the integrated value V is lower than the threshold value Vthr, the process proceeds from step ST2 to step ST8, where a determination is made as to the setting of the failure flag F (step ST8). In this case, since the failure flag F was set in the previous operation cycle (by this time, by the failure detection routine of FIG. 8, verification has been completed-regarding a failure, such as the destruction of the first satellite sensor or its detachment from the attached position), instead of proceeding to step ST5, the process completes the current operation cycle to move to a next operation cycle, and the operation is repeated from step ST1.

Thus, as shown in the collision determination routine of FIG. 7, if the collision on the front side of the vehicle is so severe as to cause the acceleration sensor of the first satellite sensor 2a to undergo a destruction or to detach from the attached position during the latter half of the collision, the acceleration signal Gf produced by the acceleration sensor of the first satellite sensor 2a is ignored.

In the described case according to the determination operation of step ST101 in the collision determination routine of FIG. 6, determination is made as to a need to operate the air bag device 15, based on the acceleration signals or their integrated values detected by the acceleration sensor of the car compartment sensor 6a for detecting impact acceleration caused by the collision on the front side of the vehicle, and the reference value designated for the acceleration signals and their integral values for the determination.

Therefore, it is possible to realize highly reliable collision determination for a collision causing the acceleration sensor of the first satellite sensor 2a to undergo a destruction or to detach from the attached position during the latter half of the collision. As a result, it is possible to avoid an erroneous operation of the air bag device 15 that may occur when the acceleration signal Gf produced by the acceleration sensor of the first satellite sensor 2a which has undergone a destruction or a detachment is used for collision determination.

In other words, even if the collision on the front side of the vehicle is so severe as to cause the acceleration sensor of the first satellite sensor 2a to undergo a destruction or to detach, it is possible to secure reliability of the operation of the air bag device 15.

Figure 8:
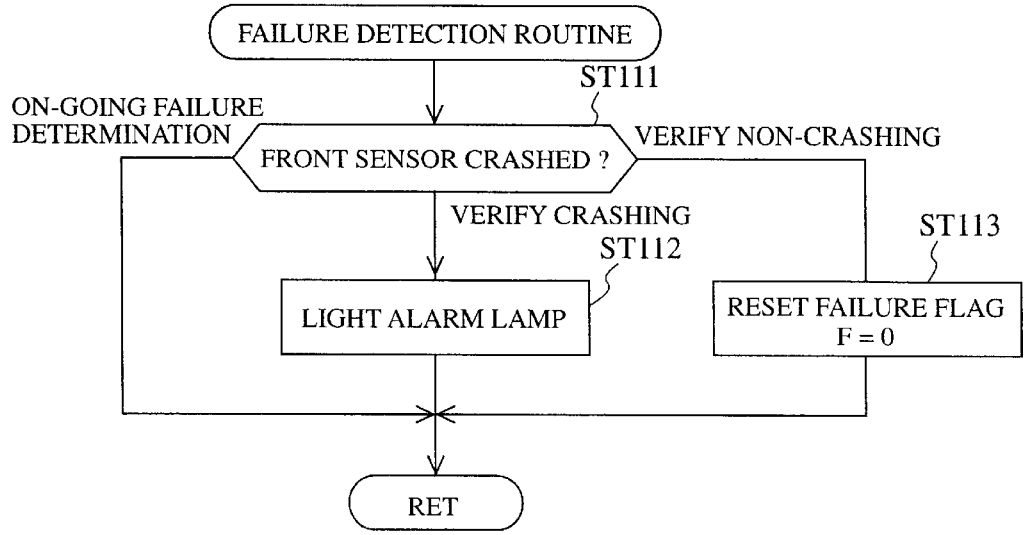
FIG. 8 is a flowchart showing a failure detection routine of the collision determination method in the passive safety device of the first embodiment of the invention.

FIG. 8 is a flowchart showing the failure detection routine instep ST202 of the flowchart of FIG. 5. In the failure detection routine shown in FIG. 8, circuit checking is carried out for the first and second satellite sensors 2a and 3a, and the vehicle right side and left side sensors 4a and 5a. Sensor failure verification (step ST111) for determination on the destruction of the sensors, alarm lamp control (step ST112) for lighting an alarm lamp when sensor destruction is verified, failure flag control (step ST113) for resetting the failure flag F when sensor destruction is not verified, are executed.

In the failure flag control of step ST113, even if it is determined in step ST2 of the collision determination routine of FIG. 7 that the integrated value V as the result of integration by the CPU 16 of the car compartment sensor 6a exceeds the preset threshold value Vthr, and even if it is determined in step ST4 of the collision routine of FIG. 7 that the failure flag F has been set, the set failure flag F is reset and returned to its original state when destruction of the sensor is not verified if the sensor failure verification of step ST111 shown in FIG. 8.

For the verification of the sensor failure in the sensor failure verification processing of step S111, the failure detection routine shown in FIG. 8 must be repeated several times or more, requiring a certain period of time.

In the foregoing, the collision determination method using the first satellite sensor 2a and the car compartment sensor 6a, and the passive safety device were described. However, similar functions are provided in the case of a collision determination method and passive safety device using the second satellite sensor 3a and the car compartment sensor 6a, or in the case of a collision determination method and a passive safety device using the first and second satellite sensors 2a and 3a and the car compartment sensor 6a.

In the foregoing description, in step ST1 of the collision determination routine shown in FIG. 7, the integrated value V obtained by integrating the acceleration signals outputted from the acceleration sensors of the car compartment sensor 6a was fetched by the front G sensor determination unit 12, and then compared with the threshold value Vthr in step ST2. However, instead of the integrated value V, the acceleration signal outputted from the acceleration sensor of the car compartment sensor 6a may be used. Moreover, in such an arrangement, the threshold value Vthr is set equal to a minimum value of a physical quantity detected by the car compartment sensor within a range where destruction of the first satellite sensor 2a could possibly occur as a result of the collision on the front side of the vehicle.

As apparent from the foregoing, according to the first embodiment, collision determination during the first half of the collision can be made faster than in the related art using the satellite sensor. If the acceleration sensor of the first satellite sensor 2a is destroyed or detached during the latter half of the collision, caused by the collision on the front side of the vehicle, the acceleration signal detected by the acceleration sensor of the first satellite sensor 2a is invalidated. The air bag device 15 is operated based on the acceleration signals produced by the acceleration sensor of the car compartment sensor 6a for detecting impact acceleration caused by the collision on the front side of the vehicle, or based on their integrated values. Thus, for collisions on the front side of the vehicle causing the destruction or detachment of the acceleration sensor of the first satellite sensor 2a, the erroneous operation of the air bag device 15 prompted by the acceleration signal outputted from the acceleration sensor of the first satellite sensor 2a which has been destroyed or detached can be prevented. As a result, it is possible to provide a collision determination method and a passive safety device capable of ensuring reliability of the operation of the air bag device 15.

Second Embodiment

Figure 9:
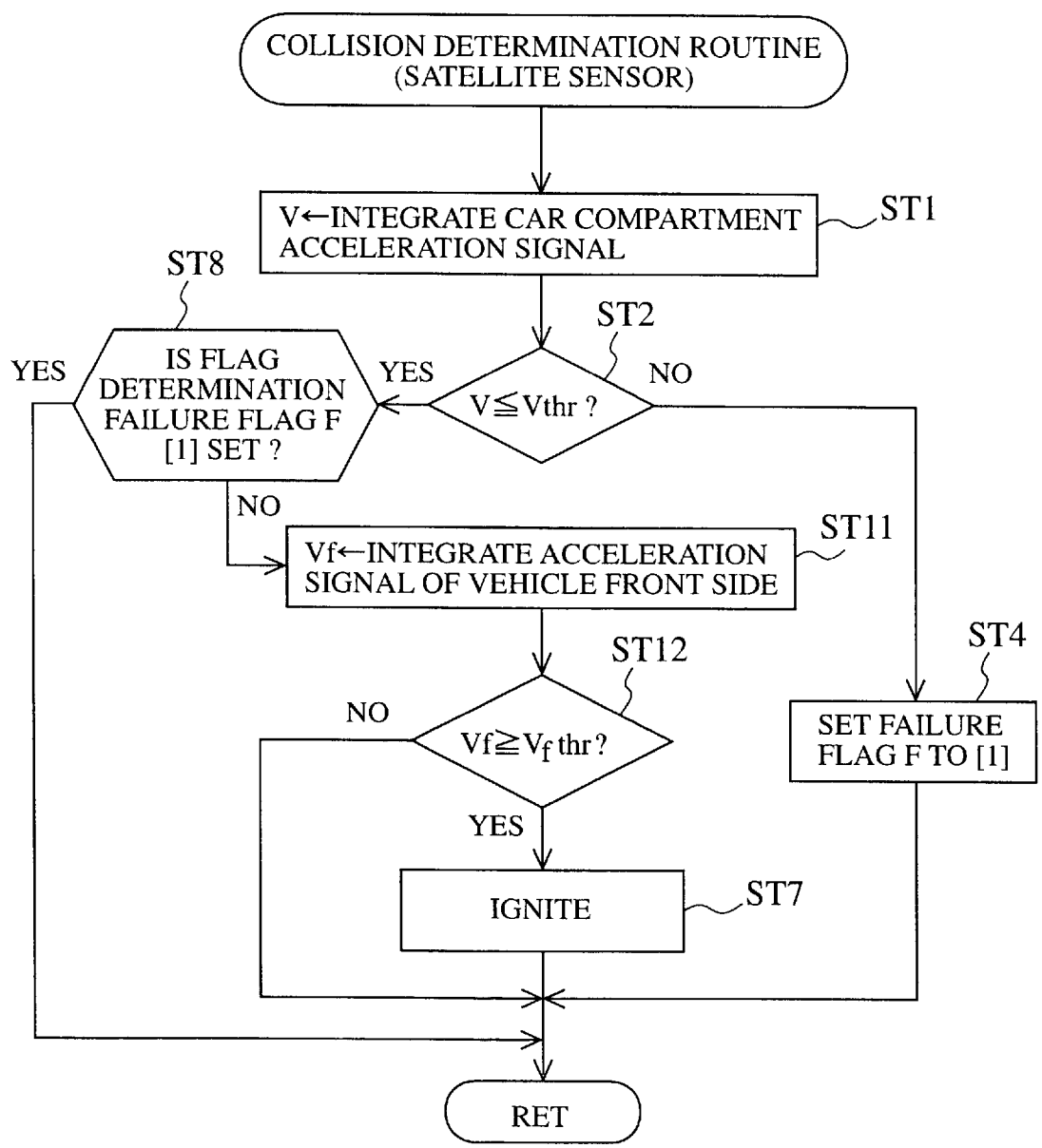
FIG. 9 is a flowchart showing a collision determination routine for performing collision determination by using a first satellite sensor in a collision determination method applied to a passive safety device according to a second embodiment of the invention.

FIG. 9 is a flowchart showing a collision determination routine using the first satellite sensor 2a in a collision determination method applied to a passive safety device according to a second embodiment. This collision determination routine may be used as an alternative to that of the first embodiment shown in FIG. 7. In FIG. 9, steps identical or similar to those in FIG. 7 are denoted by like reference numerals, and the description thereof will be omitted.

The passive safety device of the second embodiment has a configuration similar to that shown in FIG. 4, and an electronic acceleration sensor is used for the first satellite sensor 2a. The relation of the collision determination routine shown in FIG. 9 to the collision determination routine of FIG. 6 and the failure detection routine of FIG. 8 is the same as the corresponding relation involving the collision determination routine according to the first embodiment.

If the collision on the front side of the vehicle is small in scale, and the acceleration sensor of the first satellite sensor 2a is not destroyed or detached, an arrangement according to the first embodiment is such that the acceleration signal Gf outputted from the acceleration sensor of the first satellite sensor 2a was fetched by the front G sensor determination unit 12 in step ST5. The second embodiment is different from the first embodiment in that an integrated value Vf of an acceleration signal outputted from the acceleration sensor of the first satellite sensor 2a is fetched by the front G sensor determination unit 12. This integrated value Vf is compared with a preset threshold value Vfthr. Based on the result of the comparison, the operation of the air bag device 15 is determined.

Here, the threshold value Vfthr is a reference value for determining whether the shock requires the operation of the air bag device 15 or not, when collision on the front side of the vehicle is small in scale, and the acceleration sensor of the first satellite sensor 2a is not destroyed or detached. This is a reference value designated for the integrated value Vf, i.e., a speed, obtained by integrating the acceleration signal outputted from the acceleration sensor of the first satellite sensor 2a. The reference value provides a stable and highly reliable collision determination for an oblique collision, i.e., the vehicle obliquely colliding with an obstacle, pole collision, i.e., the vehicle colliding head-on with a pole or the like, offset collision, i.e., only half of the front side of the vehicle colliding head-on, underride collision, i.e., the vehicle colliding from behind a truck or the like by sliding in between the vehicle body and the ground, and so on, by eliminating the effect of a noise component in the shocks of the collision.

Specifically, even if a collision on the front side of the vehicle is so severe as to cause the destruction or detachment of the acceleration sensor of the first satellite sensor 2a, collision determination is carried out until the acceleration sensor is destroyed. In a manner similar to the first embodiment, after the acceleration sensor is destroyed or detached, the integrated value Vf of the acceleration signal produced by the acceleration sensor of the first satellite sensor 2a is ignored. Then, the erroneous operation of the air bag device 15 caused by the destruction or detachment of the acceleration sensor of the first satellite sensor 2a is prevented, making it possible to secure reliability of the operation of the air bag device 15.

In addition, the second embodiment is adapted for collisions in which a destruction or detachment of the acceleration sensor of the first satellite sensor 2a is not caused, in which an acceleration signal outputted from the acceleration sensor of the car compartment sensor unit 6 at the time of collision is small, but in which the air bag device 15 needs to be operated, for example, an oblique collision, i.e., the vehicle obliquely colliding with an obstacle, pole collision, i.e., the vehicle colliding head-on with a pole or the like, offset collision, only half of the front side of the vehicle colliding head-on, and underride collision, i.e., the vehicle colliding from behind a truck or the like by sliding in between the vehicle body and the ground. This can be achieved by step ST12, where a determination is made as to whether shocks occur necessitating the operation of the air bag device 15, based on the integrated value Vf of the acceleration signal outputted from the acceleration sensor of the first satellite sensor 2a, and the threshold value Vfthr. In a subsequent step ST7, the air bag device 15 is activated reliably and promptly in the event of such a collision.

As apparent from the foregoing, according to the second embodiment, by eliminating the effect of a noise component, faster collision determination is carried out based on the integrated value Vf of the acceleration signal outputted from the acceleration sensor of the first satellite sensor during the first half of the collision, making is possible to ensure reliable operation of the air bag device 15. In addition, if the collision on the front side of the vehicle causes the destruction or detachment of the acceleration sensor of the first satellite sensor 2a during the latter half of the collision, the integrated value Vf of the acceleration signal outputted from the acceleration sensor of the first satellite sensor 2a is invalidated, ensuring reliability of the operation of the air bag device 15. Thus, it is possible to provide a highly reliable collision determination method and a passive safety device.

Third Embodiment

Figure 10:
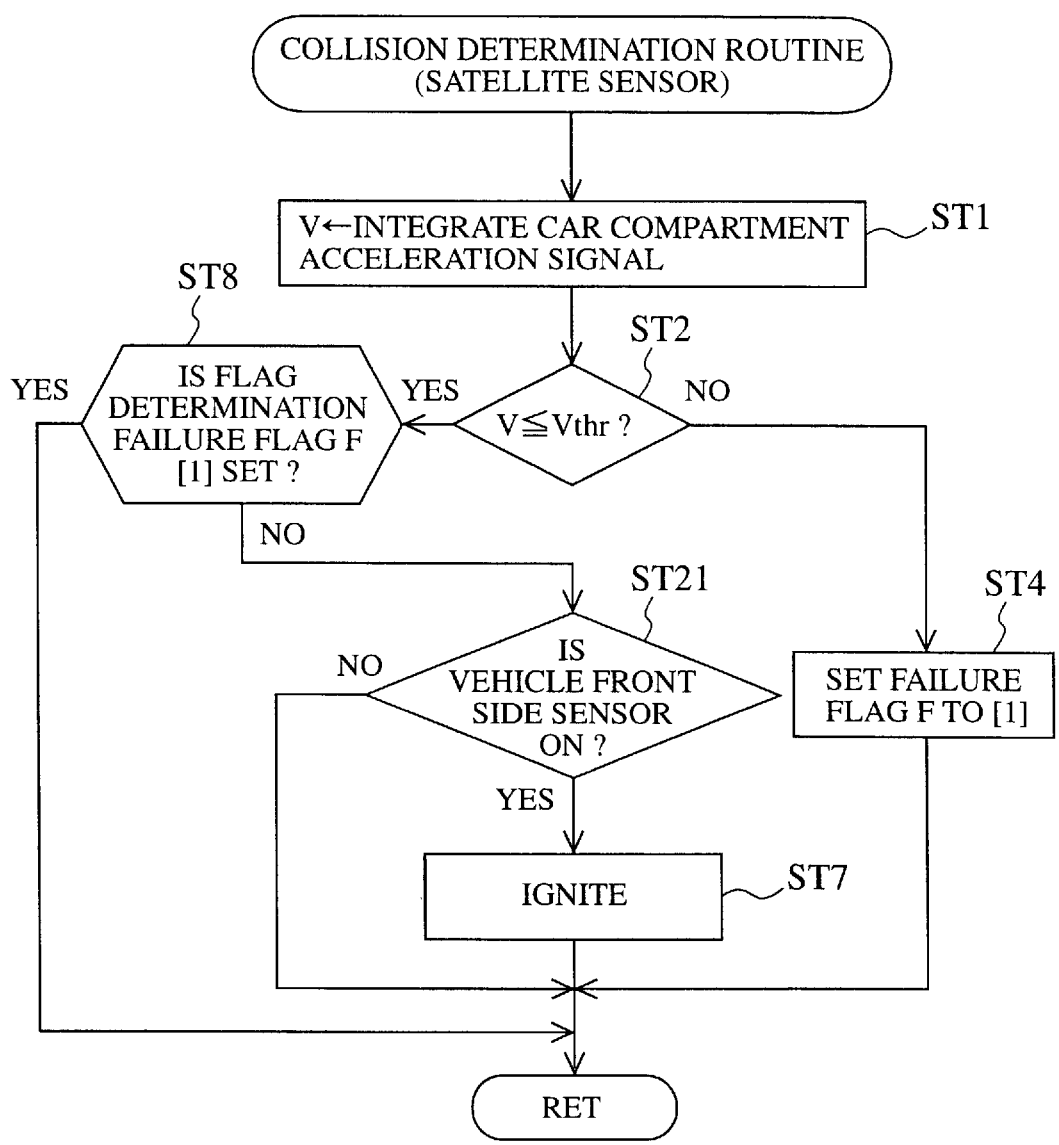
FIG. 10 is a flowchart showing a collision determination routine for performing collision determination by using a first satellite sensor in a collision determination method applied to a passive safety device according to a third embodiment of the inventions.

FIG. 10 is a flowchart showing a collision determination routine using the first satellite sensor 2a in a collision determination method applied to a passive safety device according to a third embodiment. This collision determination routine is an alternative to the collision determination routine according to the first embodiment shown in FIG. 7. In FIG. 10, steps identical or similar to those of FIG. 7 are denoted by like reference numerals, and the description thereof will be omitted.

The configuration of the passive safety device of the third embodiment is similar to that shown in FIG. 4. The relation of the collision determination routine shown in FIG. 10 to the collision determination routine of FIG. 6 and the failure detection routine of FIG. 8 is the same as the corresponding relation involving the collision determination routine according to the first embodiment. While the electronic acceleration sensor is used for the first satellite sensor 2a in the first and second embodiments, a mechanical acceleration sensor is used in the third embodiment. This mechanical acceleration sensor outputs an ON signal when shocks of a magnitude necessitating the operation of the air bag device 15 are applied.

Next, an operation will be described.

The operations of steps ST1, ST2, ST4, ST7 and ST8 are similar to those described above with reference to the first and second embodiments, and thus the description thereof will be omitted.

Step ST21 ensures activation of the air bag device 15 for a collision, in which an integrated value V of an acceleration sensor detected by the car compartment sensor 6a is small (integrated value V≦threshold value), in which the first satellite sensor 2a does not is not destroyed, but in which the acceleration sensor of the first satellite sensor 2a outputs an ON signal. The air bag device 15 is operated according to the ON signal outputted from the acceleration sensor of the first satellite sensor 2a, making it possible to promptly protect the occupant from the collision on the front side of the vehicle.

In addition, if collision on the front side of the vehicle is so severe as to cause the destruction or detachment of the acceleration sensor of the first satellite sensor 2a, the ON signal produced by the acceleration sensor of the first satellite sensor 2a is ignored, as in the cases of the first and second embodiments. Thus, even if the acceleration sensor of the first satellite sensor 2a is destroyed or detached and thus continuously outputs an ON signal, the erroneous operation of the air bag device 15 caused by the destruction of the acceleration sensor of the first satellite sensor 2a can be prevented, ensuring reliability of the operation of the air bag device 15.

As apparent from the foregoing, according to the third embodiment, collision determination during the first half of the collision can be carried out promptly, based on the output of the satellite sensor. In addition, if the acceleration sensor of the first satellite sensor 2a is destroyed or detached during the latter half of the collision, the signal outputted from the acceleration sensor of the first satellite sensor 2a is ignored, and the air bag device 15 can be operated according to the collision determination routine of FIG. 6, based on the acceleration signals or their integrated values detected by the car compartment sensor 6a. Thus, in the case of the collision on the front side of the vehicle, causing the destruction or detachment of the acceleration sensor of the first satellite sensor 2a, the erroneous operation of the air bag device 15 caused by the ON signal outputted by the acceleration sensor which has been destroyed or detached can be prevented. Thus, it is possible to provide a collision determination method and a passive safety device capable of ensuring reliability of the operation of the air bag device 15.

Fourth Embodiment

Figure 11:
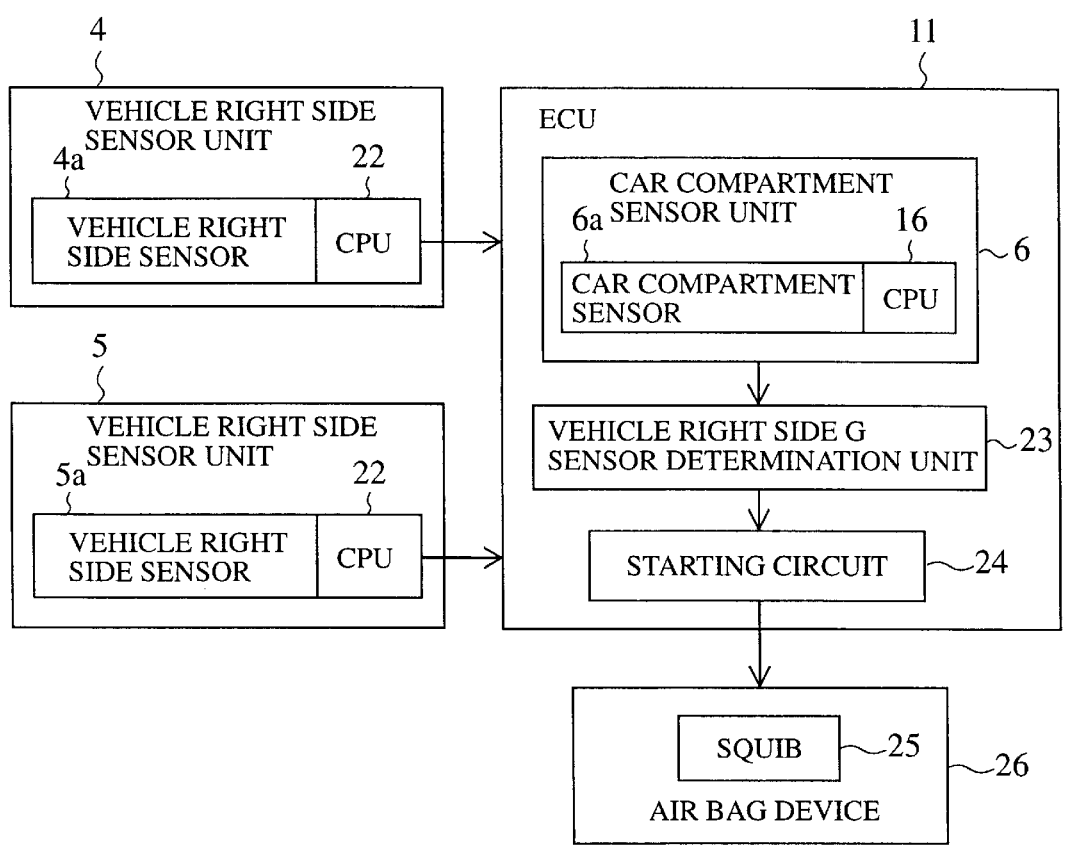
FIG. 11 is a block diagram showing a configuration of a passive safety device according to a fourth embodiment of the invention.

FIG. 11 is a block diagram showing the configuration of a passive safety device using the vehicle right side sensor (first sensor) 4a and the car compartment sensor (second sensor) 6a, according to a fourth embodiment. In FIG. 11, portions identical or similar to those of FIG. 4 are denoted by like reference numerals, and the description thereof will be omitted. In the fourth embodiment, an electronic acceleration sensor is used for the vehicle right side sensor 4a.

In the drawing, a reference numeral 22 denotes a CPU for processing an electric acceleration signal produced by the vehicle right side sensor 4a. This CPU 22 is necessary when the electronic acceleration sensor is used for the vehicle right side sensor 4a. However, it is not necessary when a mechanical acceleration sensor is used.

A reference numeral 23 denotes a vehicle side part G sensor determination unit (collision determination means) provided in the ECU 11, which is designed to perform collision determination based on an acceleration signal detected by the vehicle right side sensor 4a, and an acceleration signal outputted from the acceleration sensor of the car compartment sensor 6a for detecting side collision on the vehicle right side.

In the fourth embodiment, an electronic acceleration sensor is used for the acceleration sensor of the car compartment sensor 6a for detecting side collision on the vehicle right side.

A reference numeral 24 denotes a starting circuit, which is designed to detonate a squib 25 based on the result of the determination by the vehicle side part G sensor determination unit 23, and start an air bag device 26 provided, for example, inside the right door of the car compartment to protect an occupant from the side collision on the vehicle right side.

Next, an operation will be described.

Figure 12:
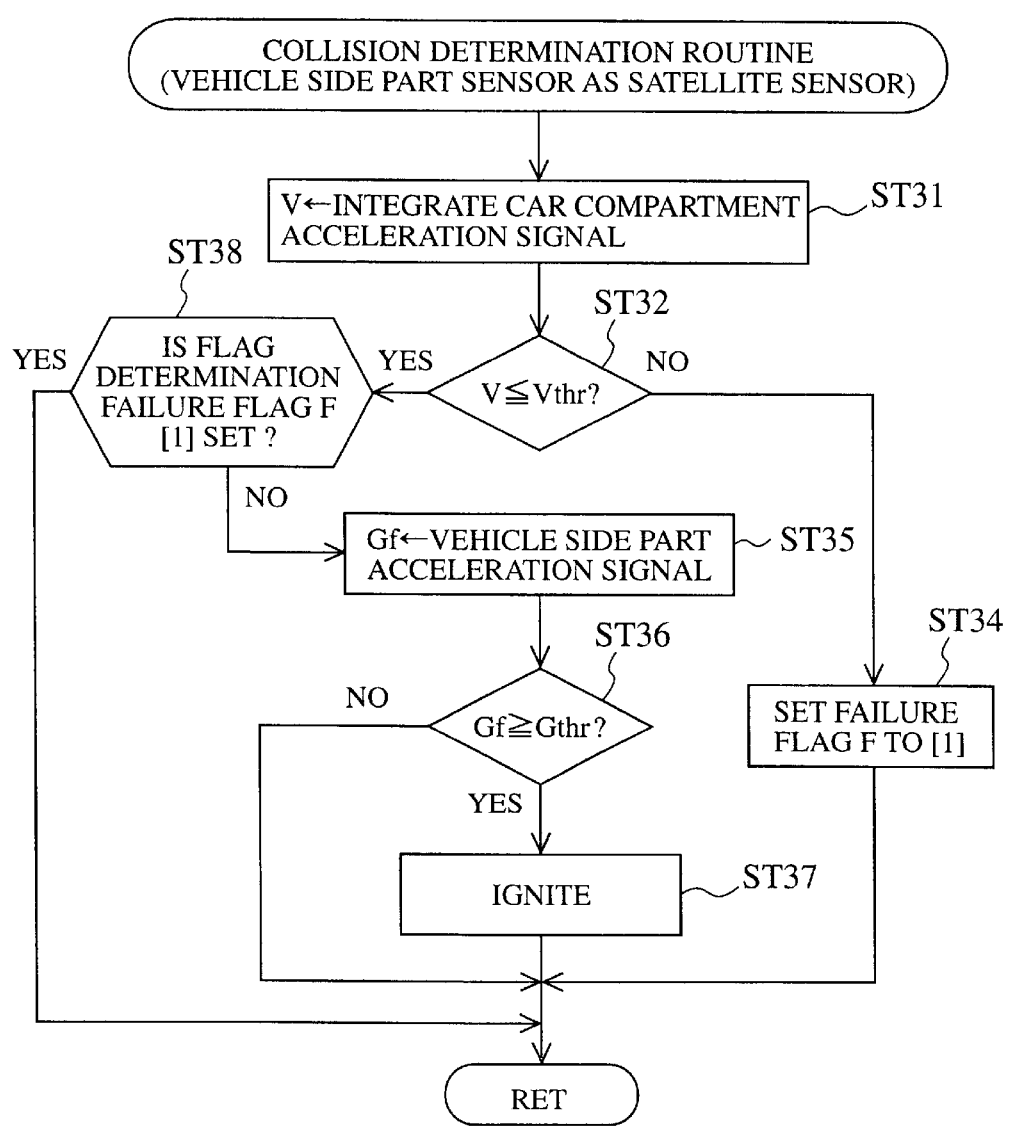
FIG. 12 is a view showing a collision determination routine for performing collision determination by using a vehicle side part sensor in a collision determination method applied to the passive safety device of the fourth embodiment of the invention.

FIG. 12 is a flowchart showing a collision determination routine using the vehicle right side sensor 4a in a collision determination method applied to the passive safety device of the fourth embodiment. This collision determination routine is an alternative to that of the first embodiment shown in FIG. 7. In the fourth embodiment, the relation of the collision determination routine of FIG. 12 to the collision determination routine of FIG. 6 and the failure detection routine of FIG. 8 is the same as the corresponding relation involving the collision determination routine of the first embodiment.

The collision determination routine of FIG. 12 assumes collision determination performed when side collision occurs on the vehicle right side. This collision determination is carried out by the vehicle side part G sensor determination unit 23 provided in the ECU 11.

First, description is made of a case where side collision on the vehicle right side is small in scale, and the vehicle right side sensor 4a is prevented from undergoing a destruction or detachment.

In this case, an integrated value V is obtained by using the CPU 16 of the car compartment sensor 6a to integrate an acceleration signal outputted from the acceleration sensor of the car compartment sensor 6a when another vehicle or the like makes side collision on the vehicle right side (this integrated value V is reset for each completion of an executed operation in the collision determination routine of FIG. 12). The integrated value V is fetched by the front G sensor determination unit 23 of the ECU 11 (step ST31).

Then, the fetched integrated value V is compared with a preset threshold value Vthr, and determination is made as to whether the integrated value V is equal to the threshold value Vthr or lower (step ST32).

Here, the threshold value Vthr is set equal to a minimum value of a physical quantity detected by the car compartment sensor within a range where destruction of the sensor disposed in the crushable area could possibly occur.

In the described case, since the collision on the vehicle right side is small in scale, causing no destruction or detachment of the acceleration sensor of the vehicle right side sensor 4a, the integrated value V is equal to the threshold value Vthr or lower. Therefore, the process proceeds to step ST38, where determination is made as to the setting of a failure flag F (flag set when there is a possibility of destruction or detachment of the vehicle right side sensor 4a). If it is determined that the failure flag F has not been set, an acceleration signal Gf produced by the acceleration sensor of the vehicle right side sensor 4a is fetched (step ST35). Then, the fetched acceleration signal Gf is compared with a present threshold value Gthr, and determination is made as to whether the acceleration signal Gf is equal to the threshold value Gthr or higher (step ST36).

Here, the threshold value Gthr is designated for the output from the acceleration sensor of the vehicle right side sensor 4a and used as a criterion for determination on a need to operate the air bag device 26.

In the described case, when the side collision on the vehicle right side is small, causing no destruction or detachment of the acceleration sensor of the vehicle right side sensor 4a, and when the acceleration signal Gf produced by the acceleration sensor of the vehicle right side sensor 4a exceeds the threshold value Vthr (Gf≧Gthr), the front G sensor determination unit 23 detonates the squib 25 using the starting circuit 24, and then activates the air bag device 26 (step ST37). If it is determined in step ST36 that the acceleration sensor of the vehicle right side sensor 4a is not destroyed or detached, and the acceleration signal Gf produced by the acceleration sensor of the vehicle right side sensor 4a does not exceed the threshold value Gthr (Gf≦Gthr), then the squib 25 is not detonated by the front G sensor determination unit 23. Thus, the air bag device 26 is not operated.

Therefore, when the side collision is such that the integrated value V of the acceleration signal detected by the acceleration sensor of the car compartment sensor 6a for detecting shocks applied to the vehicle right side is small in scale, causing no destruction or detachment of the acceleration sensor of the vehicle right side sensor 4a, and when the shocks is sufficiently large to cause the acceleration signal Gf detected by the acceleration sensor of the vehicle right side sensor 4a to exceed the threshold value Gthr, necessitating the activation of the air bag device 26, collision determination can be carried out promptly, based on the output of the vehicle right side sensor 4a during the first half of the collision. The air bag device 26 is operated according to the acceleration signal detected by the electronic acceleration sensor of the vehicle right side sensor 4a, making it possible to promptly protect the occupant from the side collision on the vehicle right side.

Next, description is made of a case where side collision on the vehicle right side is so severe as to cause destruction or detachment of the acceleration sensor of the vehicle right side sensor 4a during the latter half of the collision.

In such collision, the integrated value V fetched in step ST31 exceeds the threshold value Vthr. Thus, in step ST32, it is determined that the integrated value V exceeds the threshold value Vthr, and the process proceeds to step ST34, where the failure flag F is set (by this time, verification has been completed by the failure detection routine shown in FIG. 8 as to a failure such as a destruction of the acceleration sensor of the vehicle right side sensor 4a, its detachment from the attached position, or the like). Then, the process proceeds to a next operation cycle.

In the next operation cycle, the process from step ST31 is repeated. Then, moving from step ST31 to step ST32, an integrated value V fetched at the current operation cycle is compared with the present threshold value Vthr, and determination is made as to whether the integrated value V is equal to the threshold value Vthr or lower. If it is determined that the integrated value V exceeds the threshold value Vthr, the process proceeds to step ST34. However, if the integrated value V is equal to the threshold value Vthr or lower, then the process proceeds from step ST32 to step ST38, where determination is made as to the setting of the failure flag F (step ST38) In this case, since the failure flag F was set at the previous operation cycle, the current operation cycle is completed to proceed to a next operation cycle, where the process is repeated again from step ST31.

Therefore, as shown in the flowchart of FIG. 12, even if the side collision on the vehicle right side is so severe as to cause a destruction of the acceleration sensor of the vehicle right side sensor 4a, its detachment from the attached position, collision determination is carried out until the acceleration sensor undergoes a destruction. After a destruction or detachment of the acceleration sensor, the acceleration signal Gf detected by the acceleration sensor of the vehicle right side sensor 4a is ignored. In addition, in this case, in the determination operation of step ST101 shown in the flowchart of FIG. 6, determination is made as to whether the air bag device 26 should be activated, based on the acceleration signal outputted from the acceleration sensor of the car compartment sensor 6a for detecting shocks caused by the side collision on the vehicle right side or its integrated value, and a reference value designated for determination on the operation of the air bag device 26. Thus, the erroneous operation of the air bag device, occurring when the acceleration signal Gf produced by the destroyed or detached acceleration sensor of the vehicle right side sensor 4a is used for collision determination, is prevented. It is therefore possible to realize highly reliable collision determination for collision causing destruction of the acceleration sensor of the vehicle right side sensor 4a or its detachment from the attached position.

In other words, it is possible to ensure reliability of the operation of the air bag device 26 even if the side collision on the vehicle right side is so severe as to cause destruction or detachment of the acceleration sensor of the vehicle right side sensor 4a.

In the foregoing, the collision determination method and the passive safety device using the vehicle right side sensor 4a and the car compartment sensor 6a were described. However, similar functions are provided even in the case of a collision determination method a passive safety device using the vehicle left side sensor 5a and the car compartment sensor 6a, and in the case of a collision determination method a passive safety device using the vehicle right side and left side sensors 4a and 5a and the.car compartment sensor 6a.

As apparent from the foregoing, according to the fourth embodiment, collision determination during the first half of the collision can be carried out more promptly than in the related art, based on the output of the vehicle side part sensor. In addition, when the side collision on the vehicle right side causes destruction or detachment of the vehicle right side sensor 4a during the latter half of the collision, the acceleration signal produced by the vehicle right side sensor 4a is ignored, and the air bag device 26 can be operated based on the acceleration signal detected by the acceleration sensor of the car compartment sensor 6a or its integrated value V. Thus, for the side collision on the vehicle right side, causing destruction or detachment of the vehicle right side sensor 4a, the erroneous operation of the air bag device 26 by the erroneous acceleration signal outputted from the crashed vehicle right side sensor 4a can be prevented. It is therefore possible to realize a collision determination method and a passive safety device capable of ensuring reliability of the operation of the air bag device 26.

Fifth Embodiment

Figure 13:
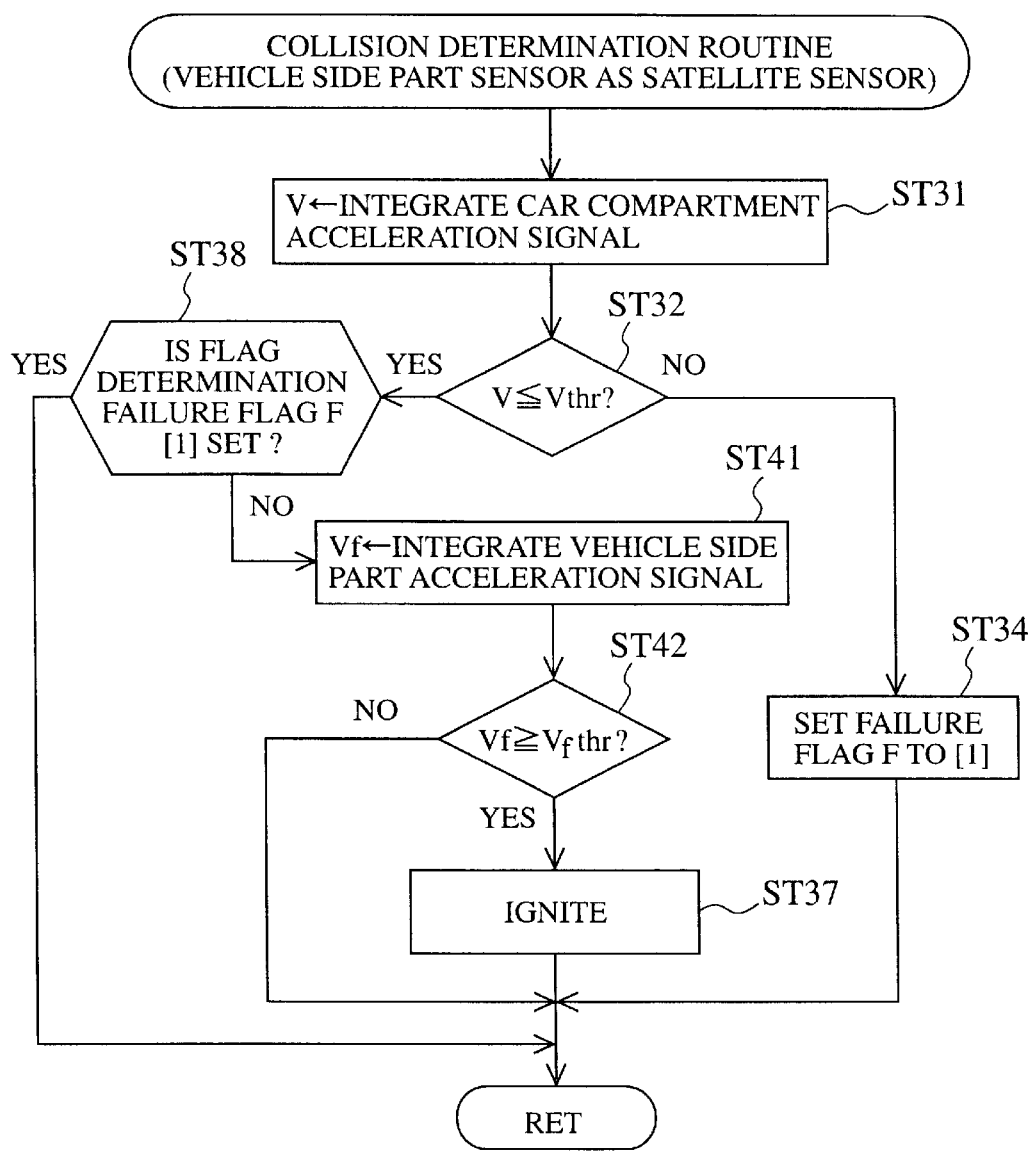
FIG. 13 is a view showing a collision determination routine for performing collision determination by using a vehicle side part sensor in a collision determination method applied to a passive safety device according to a fifth embodiment of the invention.

FIG. 13 is a flowchart showing a collision determination routine using the vehicle right side sensor 4a in a collision determination method applied to a passive safety device according to a fifth embodiment. This collision determination routine is an alternative to that of the fourth embodiment shown in FIG. 12. In FIG. 13, steps identical or similar to those of FIG. 12 are denoted by like reference numerals, and the description thereof will be omitted.

The relation of the collision determination routine of FIG. 13 to the collision determination routine of FIG. 6 and the failure detection routine of FIG. 8 is identical to the corresponding relation involving the collision determination routine of the fourth embodiment.

In addition, the configuration of the passive safety device of the fifth embodiment is similar to that shown in FIG. 11, and an electronic acceleration sensor is used for the vehicle right side sensor 4a.

The fourth embodiment deals with a case where side collision on the vehicle right side is small in scale, causing no destruction or detachment of the vehicle right side sensor 4a, by ensuring in step ST35 that the acceleration signal Gf outputted from the vehicle right side sensor 4a is fetched by the vehicle side part G sensor determination unit 23. In contrast, the fifth embodiment ensures that the vehicle side part G sensor determination unit 23 fetches an integrated value Vf of an acceleration signal outputted from the vehicle right side sensor 4a, the integrated value Vf of the acceleration signal outputted from the vehicle right side sensor 4a is compared with a preset threshold value Vfthr and, based on the result of the comparison, a determination is made as to whether the air bag device 26 is to be activated.

The threshold value Vfthr is designated for the integrated value of the acceleration signal outputted from the vehicle right side sensor 4a produced in response to shocks that mark a threshold for determination on the need to activate the air bag device 26.

Specifically, even if collision on the vehicle right side is so severe as to cause destruction or detachment of the vehicle right side sensor 4a, collision determination is carried out until the sensor is destructed or detached. After the destruction or detachment of the sensor, as in the case of the fourth embodiment, the integrated value of the acceleration signal detected by the vehicle right side sensor 4a is ignored so that the erroneous operation of the air bag device 26 caused by the destruction or detachment of the vehicle right side sensor 4a is prevented, making it possible to ensure reliability of the operation of the air bag device 26.

In addition, for collisions in which the vehicle right side sensor 4a is not destructed but in which the air bag device 26 must be activated despite the fact that the acceleration signal outputted from the vehicle right side sensor 4a at the time of collision is small (for example, for oblique collisions where the vehicle right side obliquely collides with an obstacle), steps ST41 and ST42 ensure that stable collision determination is carried out for shocks necessitating the operation of the air bag device 26, by eliminating a noise component promptly during the first half of the collision, based on the integrated value Vf of the acceleration signal outputted from the vehicle right side sensor 4a and the threshold value Vfthr. In subsequent step ST37, operation of the air bag device 26 is ensured in response to such collisions.

As apparent from the foregoing, according to the fifth embodiment, collision determination can be carried out promptly based on the output of the vehicle right side sensor 4a during the first half of the collision. Operation of the air bag device 26 is ensured even for oblique collision, i.e., the vehicle right side obliquely colliding with the obstacle. Moreover, if the side collision on the vehicle right side causes destruction or detachment of the vehicle right side sensor 4a during the latter half of the collision, the integrated value Vf of the erroneous acceleration signal detected and outputted by the vehicle right side sensor 4a is ignored, ensuring reliability of the operation of the air bag device 26. Thus, it is possible to realize a highly reliable collision determination method and a passive safety device.

Sixth Embodiment

Figure 14:
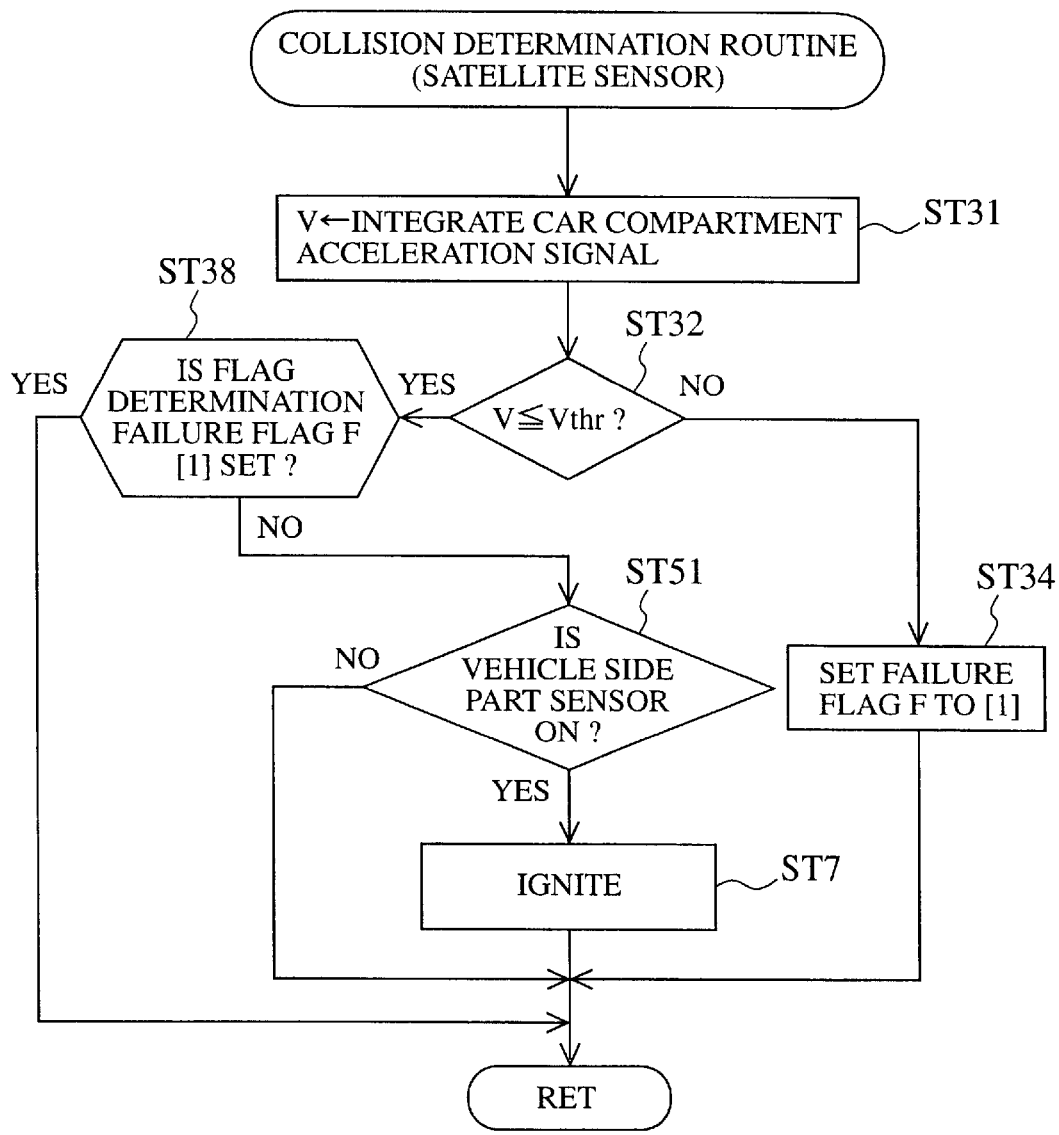
FIG. 14 is a view showing a collision determination routine for performing collision determination by using a vehicle side part sensor in a collision determination method applied to a passive safety device according to a sixth embodiment of the invention.

FIG. 14 is a flowchart showing a collision determination routine using the vehicle right side sensor 4a in a collision determination method applied to a passive safety device according to a sixth embodiment. This collision determination routine is an alternative to that of the fifth embodiment shown in FIG. 13. In FIG. 14, steps identical or similar to those of FIG. 13 are denoted by like reference numerals, and the description thereof will be omitted.

The relation of the collision determination routine of FIG. 14 to the collision determination routine of FIG. 6 and the failure detection routine of FIG. 8 is identical the corresponding relation involving the collision determination routine of the fifth embodiment.

The configuration of the passive safety device of the sixth embodiment is similar to that shown in FIG. 11. In the fourth and fifth embodiments, the electronic acceleration sensor is used for the vehicle right side sensor 4a. However, in the sixth embodiment, a mechanical acceleration sensor is used. This mechanical acceleration sensor outputs an ON signal when shocks of a magnitude necessitating the operation of the air bag device 26 are applied.

Next, an operation will be described.

The operations of steps ST31, ST32, ST34, ST37 and ST38 are similar to those of the fourth and fifth embodiments, and thus the description thereof will be omitted.

The sixth embodiment is like the foregoing embodiments in that, even if side collision on the vehicle right side is severe, causing destruction or detachment of the acceleration sensor of the vehicle right side sensor 4a, collision determination is carried out until the sensor is destructed or detached. After the destruction or detachment of the sensor, as in the cases of the fourth and fifth embodiments, an ON signal outputted from the acceleration sensor of the vehicle right side sensor 4a is ignored. Even if the acceleration sensor of the vehicle right side sensor 4a is destructed or detached to continuously output an ON signal, the erroneous operation of the air bag device 26 caused by the destruction or detachment of the acceleration sensor of the vehicle right side sensor 4a can be prevented, ensuring reliability of the operation of the air bag device For collisions, in which an integrated value of the acceleration signal detected by the acceleration sensor of the car compartment sensor 6a for detecting shocks caused by the side collision on the vehicle right side is sufficiently small in scale (integrated value $\leq$ threshold value Vthr) so as not to cause destruction or detachment of the vehicle right side vehicle 4a, but in which shocks applied to the vehicle right side cause the vehicle right side sensor 4a to output an ON signal and necessitate the operation of the air bag device 26, step ST51 ensures that the air bag device 26 is operated according to the ON output of the vehicle right side sensor 4a. As a result, even in the case of the collision in which the vehicle right side sensor 4a is not destructed or detached but in which the shocks applied to the vehicle right side necessitate the operation of the air bag device 26, collision determination can be carried out promptly, based on the output of the vehicle right side sensor during the first half of the collision, making it possible to promptly protect the occupant.

As apparent from the foregoing, according to the sixth embodiment; collision determination can be carried out promptly based on the output of the vehicle right side sensor during the first half of the collisions. Moreover, when the side collision on the vehicle right side causes destruction or detachment of the vehicle right side sensor 4a during the latter half of the collision, the ON signal outputted by the vehicle right side sensor 4a is ignored, and the air bag device 26 can be operated based on the acceleration signal detected by the acceleration sensor of the car compartment sensor 6a or its integrated value. Thus, even if the side collision on the vehicle right side causes a destruction or detachment of the vehicle right side sensor 4a to fail to output an ON signal, or to continuously output an ON signal, the erroneous operation of the air bag device 26 can be effectively prevented. It is therefore possible to realize a collision determination method capable of ensuring reliability of the operation of the air bag device 26 and a passive safety device.

INDUSTRIAL APPLICABILITY

As apparent from the foregoing, the collision determination method and the passive safety device of the present invention are suitable for protection of the occupant by operating the air bag device without any erroneous determination even for shocks causing a destruction of the satellite sensor or the acceleration sensor of the vehicle side part sensor.

What is claimed is:

1. A collision determination method for making a determination as to whether the collision necessitates an operation of an air bag device based on sensor outputs in response to shocks detected in a crushable area which is a first section to undergo destruction, and a safety area having shocks applied therein later, comprising the steps of:

presetting a first reference value, the first reference value being a minimum value of a physical quantity detected by a car compartment sensor within a range where destruction of the sensor disposed in the crushable area could occur as a result of the shocks applied in the crushable area; and invalidating the sensor output detected in the crushable area, when a physical quantity of the sensor output detected in the safety area as a result of the shocks applied in the crushable area exceeds the first reference value.

2. The collision determination method according to claim 1, further comprising the steps of:

when the physical quantity of the sensor output detected in the safety area as a result of the shocks applied in the crushable area is smaller than the first reference value, comparing the sensor output detected in the crushable area with a second reference value preset as a criterion for determination of a need to operate the air bag device, under a condition that the physical quantity of the sensor output detected in the safety area has not exceeded the first reference value; and making a determination as to whether the collision necessitates an operation of the air bag device, based on a result of the comparison.

3. The collision determination method according to claim 1, further comprising the steps of:

when the physical quantity of the sensor output detected in the safety area as a result of the shocks applied in the crushable area is smaller than the first reference value, comparing an integrated value of the sensor output detected in the crushable area with a third reference value preset as a criterion for determination of a need to operate the air bag device, under a condition that the physical quantity of the sensor output detected in the safety area has not exceeded the first reference value; and making a determination as to whether the collision necessitates an operation of the air bag device, based on a result of the comparison.

4. The collision determination method according to claim 1, further comprising the step of:

when the physical quantity of the sensor output detected in the safety area as a result of the shocks applied in the crushable area is smaller than the first reference value, making a determination as to whether the collision necessitates an operation of the air bag device based on an ON/OFF signal outputted when the shocks necessitating an operation of the air bag device are applied in the crushable area, under a condition that the physical quantity of the sensor output detected in the safety area has not exceeded the first reference value.

5. The collision determination method according to claim 1, further comprising the step of:

making a determination as to whether the collision necessitates an operation of the air bag device, based on the sensor output resulting from the shocks detected in the crushable area, under a condition that a failure diagnosis verifies that the sensor disposed in the crushable area does not undergo destruction even if the output of a sensor disposed in the safety area exceeds the first reference value in response to the shocks applied in the crushable area.

6. A passive safety device for protecting an occupant by detecting shocks and operating an air bag, comprising:

a first sensor disposed in a crushable area which is a first area to undergo destruction as a result of a collision;

a second sensor disposed in a safety area which undergoes shocks resulting from the collision later; and collision determination means for presetting a first reference value, the first reference value indicating a physical quantity detected by a car compartment sensor within a range where destruction of a sensor disposed in the crushable area could occur as a result of the shocks applied in the crushable area, and invalidating a sensor output detected by said first sensor, when a physical quantity of a sensor output detected by said second sensor as a result of the shocks applied in the crushable area exceeds the first reference value.

7. The passive safety device according to claim 6, wherein said collision determination means:

compares, when the physical quantity of the sensor output detected by the second sensor as a result of the shocks applied in the crushable area is smaller than the first reference value, a value of the sensor output detected by the first sensor with a second reference value preset as a criterion for determination of a need to operate the air bag device, under a condition that the physical quantity of the sensor output detected by the second sensor has not exceeded the first reference value; and makes a determination as to whether the collision necessitates an operation of the air bag device, based on a result of the comparison.

8. The passive safety device according to claim 6, wherein said collision determination means:

compares, when the physical quantity of the sensor output detected by the second sensor as a result of the shocks applied in the crushable area is smaller than the first reference value, an integrated value of the sensor output detected by the first sensor with a third reference value preset as a criterion for determination of a need to operate the air bag device, under a condition that the physical quantity of the sensor output detected by the second sensor has not exceeded the first reference value; and makes a determination as to whether the collision necessitates an operation of the air bag device, based on a result of the comparison.

9. The passive safety device according to claim 6, wherein said collision determination means:

makes a determination, when the physical quantity.of the sensor output detected by the second sensor as a result of the shocks applied in the crushable area, is smaller than the first reference value, as to whether the collision necessitates an operation of the air bag device based on an ON/OFF signal outputted when shocks necessitating an operation of the air bag device a reapplied in th crushable area, under a condition that the physical quantity of the sensor output detected by the second sensor has not exceeded the first reference value.

* * * * *